(12) United States Patent
Saito et al.

(10) Patent No.: US 8,388,237 B2
(45) Date of Patent: Mar. 5, 2013

(54) OPTICAL CONNECTOR AND METHOD OF ASSEMBLING OPTICAL CONNECTOR

(75) Inventors: Daigo Saito, Sakura (JP); Kazuhiro Takizawa, Sakura (JP); Serin Khee Yen Tan, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/207,646

(22) Filed: Aug. 11, 2011

(65) Prior Publication Data

US 2011/0293224 A1  Dec. 1, 2011

Related U.S. Application Data

(63) Continuation of application No. PCT/JP2009/007172, filed on Dec. 24, 2009.

(30) Foreign Application Priority Data

Feb. 13, 2009 (JP) ................................ 2009-031875

(51) Int. Cl.
*G02B 6/36* (2006.01)

(52) U.S. Cl. ............... 385/81; 385/53; 385/56; 385/60; 385/62; 385/66; 385/69; 385/86; 385/87

(58) Field of Classification Search .................... 385/53, 385/56, 60, 62, 66, 69, 81, 86, 87

See application file for complete search history.

(56) References Cited

U.S. PATENT DOCUMENTS

| 5,644,673 | A | * | 7/1997 | Patterson | ...................... 385/138 |
| 6,035,090 | A | * | 3/2000 | Kawaguchi et al. | .......... 385/139 |
| 6,206,581 | B1 | | 3/2001 | Driscoll et al. | |
| 6,997,620 | B2 | | 2/2006 | Kurooka et al. | |
| 2008/0273837 | A1 | * | 11/2008 | Margolin et al. | ............... 385/62 |

FOREIGN PATENT DOCUMENTS

| JP | 1-179109 A | 7/1989 |
| JP | 4-097108 A | 3/1992 |
| JP | 10-206687 A | 8/1998 |
| JP | 2005-024965 A | 1/2005 |
| JP | 2009-104069 A | 5/2009 |

* cited by examiner

*Primary Examiner* — Brian Healy
*Assistant Examiner* — Guy Anderson
(74) *Attorney, Agent, or Firm* — Sughrue Mion, PLLC

(57) ABSTRACT

An optical connector that is assembled at the terminal of an optical fiber cable that integrates an optical fiber and a tension-resisting member extending in the longitudinal direction of the optical fiber, the optical connector including: a connector body having a stationary portion at the rear end thereof, the stationary portion having a threaded portion formed on the outer periphery surface, and a fixing cap that is screwed onto the threaded portion of the stationary portion, wherein the fixing cap fixes the tension-resisting member that has been drawn out from the optical fiber cable terminal by sandwiching the tension-resisting member between the fixing cap and the connector body when the fixing cap is screwed onto the stationary portion.

5 Claims, 5 Drawing Sheets

OPTICAL CONNECTOR AND METHOD OF ASSEMBLING OPTICAL CONNECTOR

CROSS REFERENCE TO RELATED APPLICATIONS

This application is a continuation application based on a PCT Patent Application No. PCT/JP2009/007172, filed Dec. 24, 2009, whose priority is claimed on Japanese Patent Application No. 2009-031875 filed Feb. 13, 2009, the entire content of which are hereby incorporated by reference.

BACKGROUND OF THE INVENTION

1. Field of the Invention

The present invention relates to an optical connector, and in particular to an on-site assembly type optical connector that can be assembled without special tools at a workplace, and to a method of assembling the optical connector.

2. Description of the Related Art

As an optical connector that is assembled at the distal end of an optical fiber cable (for example, an optical cord) that has tension resisting fibers, there is one that has a structure that anchors the tension resisting fibers.

As such an anchor structure, there is for example a structure that crimp-fixes the tension resisting fibers to a stop ring by a crimping member (refer to Japanese Unexamined Patent Application, First Publication No. H10-206687 and U.S. Pat. No. 6,206,581).

In the crimp-fixing structure, attachment of the crimping member is performed by a specialized tool.

However, in the aforementioned optical connector, since a specialized tool is required for assembly, the assembly work is troublesome, and thus simplification of the work has been sought.

The present invention was achieved in view of the aforementioned circumstances, and the object thereof is providing an optical connector that can easily be assembled and can impart sufficient strength to the connection portion with an optical fiber cable, and a method of assembling the optical connector.

SUMMARY

An optical connector according to a first aspect of the present invention is an optical connector that is assembled at the terminal of an optical fiber cable that integrates an optical fiber and a tension-resisting member extending in the longitudinal direction of the optical fiber, the optical connector including: a connector body having a stationary portion at the rear end thereof, the stationary portion having a threaded portion formed on the outer periphery surface, and a fixing cap that is screwed onto the threaded portion of the stationary portion, wherein the fixing cap fixes the tension-resisting member that has been drawn out from the optical fiber cable terminal by sandwiching the tension-resisting member between the fixing cap and the connector body when the fixing cap is screwed onto the stationary portion.

In the optical connector according to the aforementioned first aspect, it may be arranged such that a front end portion of the fixing cap is thin-walled, the connector body includes the stationary portion and a base portion, the stationary portion extends from the base portion and has a cylindrical shape, and when fixing the tension-resisting member, the tension-resisting member is sandwiched between the fixing cap and the base portion of the connector body, and the front end portion of the fixing cap is deformed in accordance with the shape of the sandwiched tension-resisting member.

An optical connector according to a second aspect of the present invention is an optical connector that is assembled at the terminal of an optical fiber cable that integrates an optical fiber and tension-resisting members extending in the longitudinal direction of the optical fiber, the optical connector including: a connector body having a stationary portion at a rear end thereof, the stationary portion having a threaded portion formed on the outer periphery surface, and a fixing cap that is screwed onto the threaded portion of the stationary portion, wherein the fixing cap fixes the tension-resisting members that have been drawn out from the optical fiber cable terminal by sandwiching the tension-resisting members between the fixing cap and the connector body when the fixing cap is screwed onto the threaded portion of the stationary portion, and the tension-resisting members are divided into a plurality of bundles and respective bundles are fixed to positions separated in the circumferential direction of the connector body.

In the optical connector according to the aforementioned second aspect, it may be arranged such that the connector body includes the stationary portion and a base portion, the stationary portion extends from the base portion and has a cylindrical shape, and when fixing the tension-resisting members, the tension-resisting members are sandwiched between the fixing cap and the stationary portion and between the fixing cap and the base portion.

In the optical connector according to the aforementioned second aspect, it may be arranged such that a front end portion of the fixing cap is thin-walled, and the front end portion of the fixing cap is deformed in accordance with the shape of the tension-resisting members that are sandwiched between the front end portion of the fixing cap and the base portion.

In the optical connector according to the aforementioned second aspect, it may be arranged such that the plurality of bundles of the tension-resisting members are fixed at rotationally symmetrical positions with respect to the center axis of the stationary portion.

A method of assembling an optical connector according to a third aspect of the present invention is a method of assembling a connector body of an optical connector at the terminal of an optical fiber cable that integrates an optical fiber and tension-resisting members, the method including: screwing the fixing cap onto a threaded portion formed on the outer periphery surface of a stationary portion of the connector body, and positioning portions of the tension-resisting members that have been drawn out from the terminal, such that when the fixing cap is screwed onto the threaded portion of the stationary portion, the tension-resisting members are sandwiched between the fixing cap and the connector body.

In the method of assembling an optical connector according to the aforementioned third aspect, it may be arranged such that during positioning of the tension-resisting members, the tension-resisting members are divided into a plurality of bundles and respective bundles are arranged at positions separated in the circumferential direction of the connector body.

Since the optical connector of the present invention fixes tension-resisting members by the screwing on of a fixing cap, it can easily and rigidly fix tension-resisting members to a housing.

Also, since the tension-resisting members are fixed at positions separated in the circumferential direction in the state of dividing them into a plurality of bundles, it can improve non-uniformity in the force that acts on the housing and the fixing cap through the tension-resisting members.

Accordingly, it is possible to impart a high strength to the connection portion with an optical fiber cable.

DETAILED DESCRIPTION OF THE PREFERRED EMBODIMENTS

Hereinbelow, an embodiment of the present invention shall be described with reference to the drawings.

Figure 1:
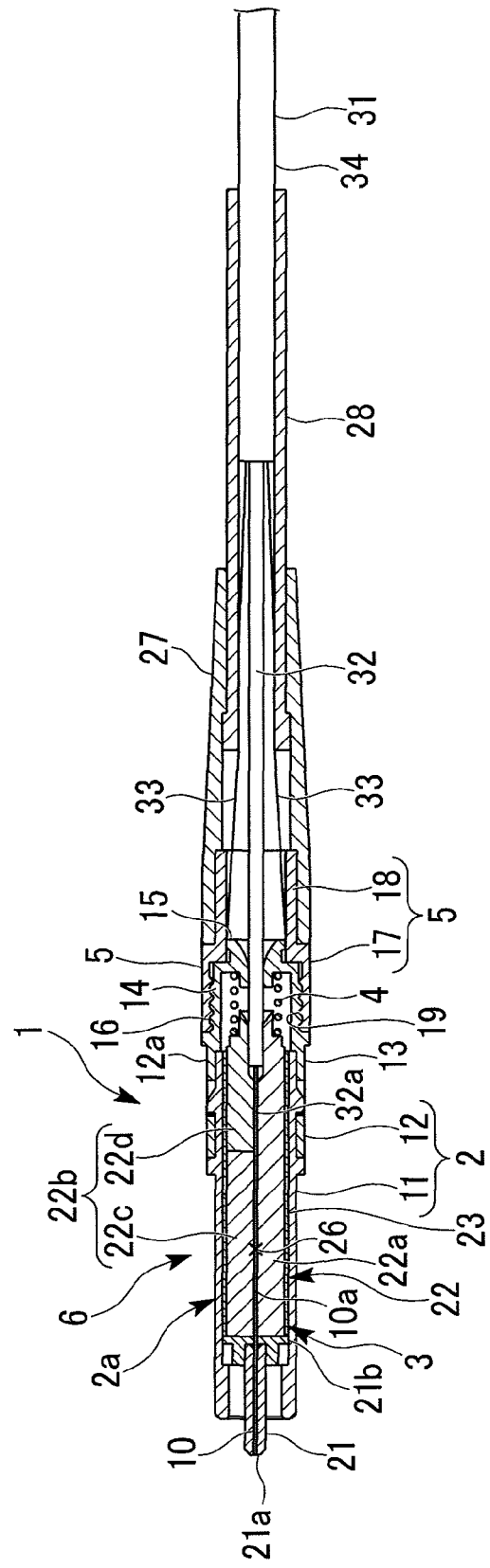
FIG. 1 is a cross-sectional view that shows the optical connector according to an embodiment of the present invention.
Figure 2:
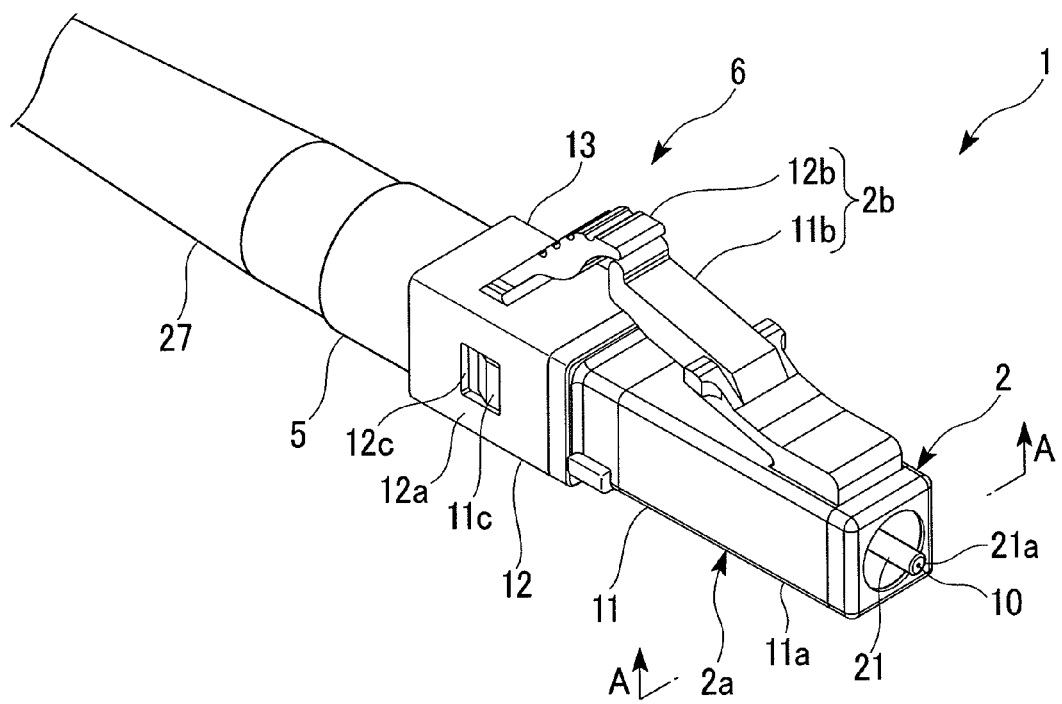
FIG. 2 is a perspective view that shows the external appearance of the optical connector.
Figure 3:
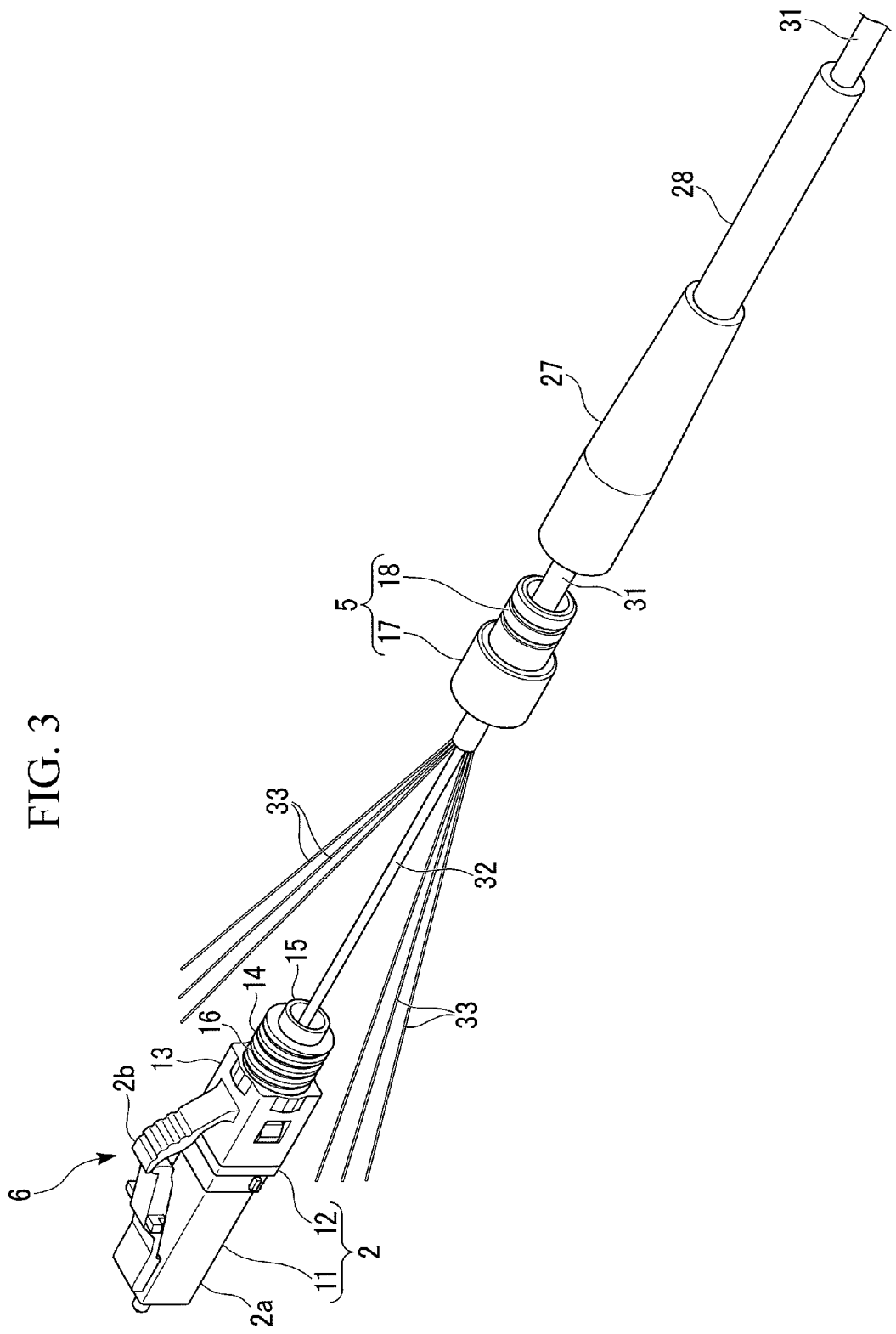
FIG. 3 is an exploded perspective view of the optical connector.
Figure 4:
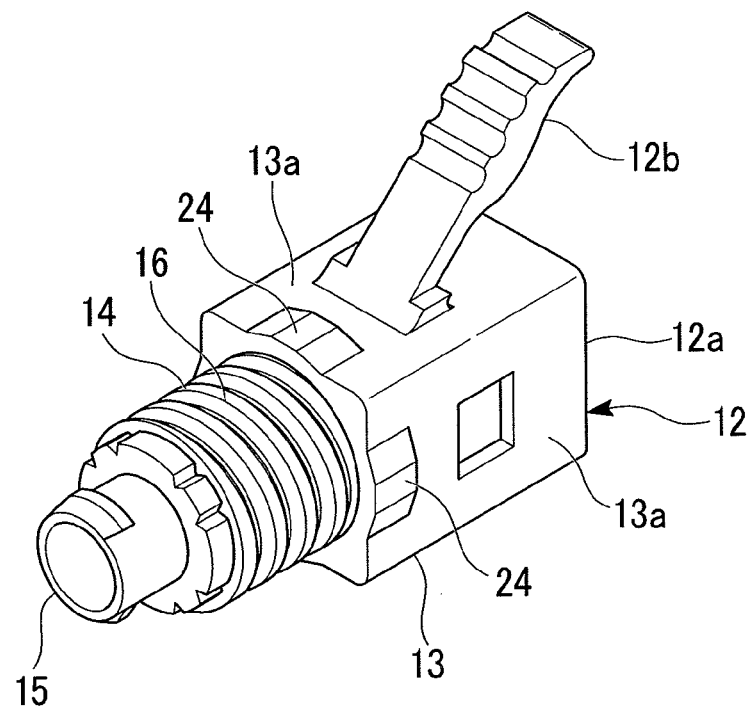
FIG. 4 is a perspective view that shows the stop ring body.
Figure 5:
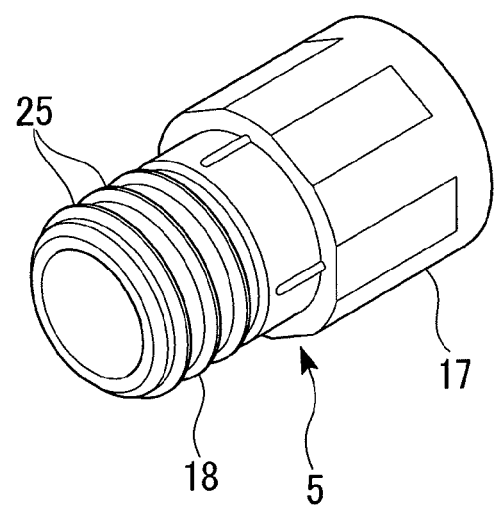
FIG. 5 is a perspective view that shows the fixing cap.
Figure 6:
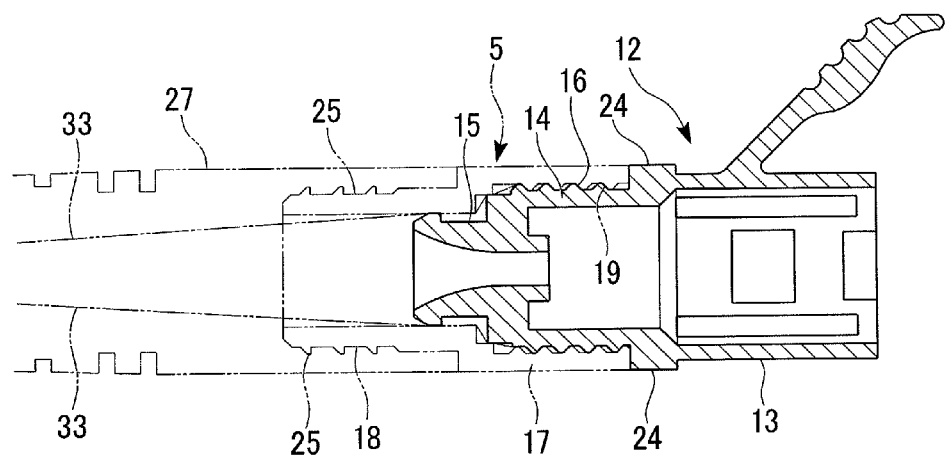
FIG. 6 is a side view that schematically shows the stop ring, the fixing cap and the boot.
Figure 7:
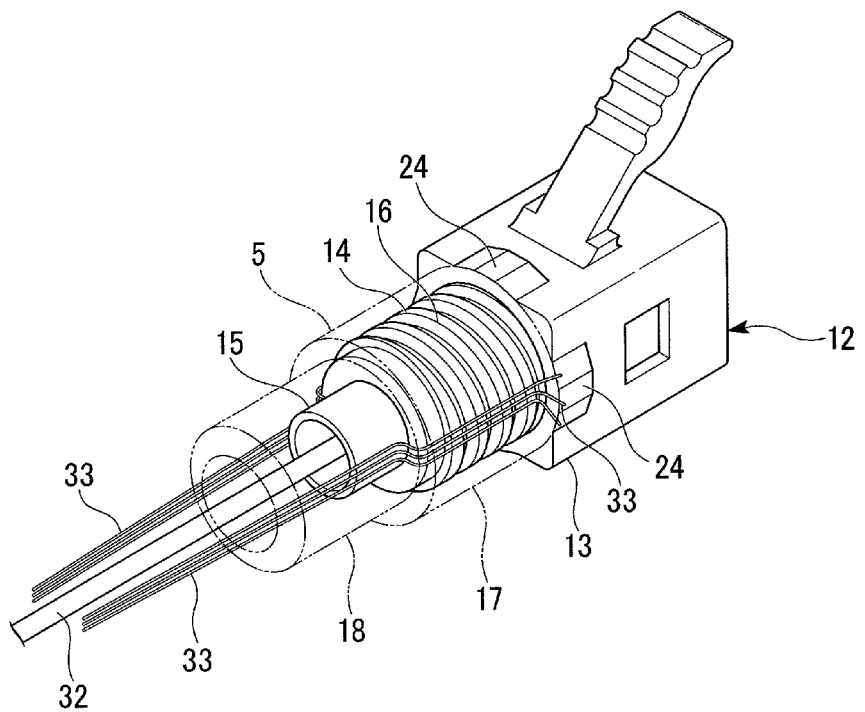
FIG. 7 is a perspective view that schematically shows the state of the tension-resisting members being fixed.

FIG. 1 is a cross-sectional view that shows an optical connector 1 according to an embodiment of the present invention. FIG. 1 is a cross-sectional view along line A-A in the direction of the arrow in FIG. 2. FIG. 2 is a perspective view that shows the external appearance of the optical connector 1. FIG. 3 is an exploded perspective view of the optical connector 1. FIG. 4 is a perspective view that shows a stop ring body 12a. FIG. 5 is a perspective view that shows a fixing cap 5 that is used in the optical connector 1. FIG. 6 is a side view that schematically shows a stop ring 12, a fixing cap 5, and a boot 27 of the optical connector 1. FIG. 7 is a perspective view that schematically shows the state of tension-resisting members 33 fixed to the optical connector 1.

As shown in FIG. 1 and FIG. 2, an optical connector 1 is assembled at the terminal of an optical fiber cable 31.

For example, the optical fiber cable 31 has a structure in which an optical fiber 32 such as an optical fiber core, and tension-resisting members 33 that extend in the lengthwise direction of the optical fiber 32 are housed in a covering 34 that consists of a resin such as polyethylene (e.g., an optical fiber cord).

As the tension-resisting member 33, an aramid fiber is suitably used, but a glass fiber or a carbon fiber and the like can also be used.

In the following description, the lower direction in FIG. 1, that is, the distal end direction of the optical fiber cable 31, is represented by "forward", while the upper direction is represented by "rearward".

The optical connector 1 is provided with a housing 2, a clamp ferrule 3 that is provided in the housing 2, a spring 4 (biasing means) that biases the clamp ferrule 3 forward, and a fixing cap 5 that is mounted on the housing 2.

The housing 2 consists of a plug frame 11 with a sleeve shape and a stop ring 12 with a cap shape into which the rear end of the plug frame 11 is fitted so that the stop ring 12 is engaged with the plug frame 11.

Note that in the present embodiment, the main body portion (housing 2, clamp ferrule 3, spring 4) on which the fixing cap 5 is mounted is called a connector body 6.

As shown in FIG. 2, the plug frame 11 is provided with a frame body 11a having a sleeve shape and a resilient piece 11b that is erected to incline obliquely from the side surface of the front end portion of the frame body 11a toward the back end side of the frame body 11a.

The stop ring 12 is provided with a stop ring body 12a having a sleeve shape, and a resilient piece 12b that is erected to incline obliquely from the side portion of the stop ring body 12a to the plug frame 11 side that is engaged with the stop ring body 12a.

The frame body 11a and the stop ring body 12a constitute a housing body 2a, and the resilient pieces 11b, 12b constitute a latch 2b.

The resilient pieces 11b, 12b are formed so that the projected distal ends thereof overlap, and by causing the resilient piece 12b to resiliently deform toward the housing body 2a, the resilient piece 11b of the plug frame 11 is pressed, and thereby is resiliently deformed toward the housing body 2a.

By causing an engagement hook 11c that is formed in the frame body 11a to enter an engagement window 12c of the stop ring body 12a to be engaged with it, the plug frame 11 and the stop ring 12 are integrated and assembled.

As shown in FIG. 3 and FIG. 4, the stop ring body 12a has a square cylinder-shaped base portion 13, a cylindrical stationary portion 14 that extends rearward from the rear end portion of the base portion 13, and an extension tube portion 15 that extends rearward from the rear end portion of the stationary portion 14.

A thread portion 16 is formed in the outer periphery surface of the stationary portion 14.

The extension tube portion 15 has a narrower diameter than the stationary portion 14, that is, the outer diameter forms a smaller cylinder, and the optical fiber 32 can be inserted into the inside thereof.

A bulging convex portion 24 is formed at the rear end portion of a side surface 13a of the base portion 13. The bulging convex portion 24 increases the surface area of the facing portion between the base portion 13 and the fixing cap 5, and so serves to increase the fixing strength of the tension-resisting members 33 that are sandwiched therebetween.

As shown in FIG. 1, the clamp ferrule 3 is provided with a ferrule 21 and a clamp portion 22 that is assembled on the rear end side of the ferrule 21 (the opposite side of the connection end surface 21a).

A built-in optical fiber 10 such as a bare optical fiber is inserted and fixed in the ferrule 21.

Hereinbelow, the built-in optical fiber 10 is sometimes called a ferrule-side optical fiber 10.

The ferrule-side optical fiber 10 projects out from the rear end of the ferrule 21, and a projected portion 10a that is the projected part is inserted between a pair of elements 22a, 22b of the clamp portion 22.

The clamp portion 22 has a structure that houses an extension portion 22a that extends from the flange portion 21b of the ferrule 21 (hereinbelow referred to as the element 22a) and the element 22b that faces it on the inner side of a sleeve-like spring 23 having a cross-sectional C shape.

The element 22b consists of two lid-side elements 22c, 22d that are arranged next to each other in the front-rear direction.

An aligning groove (not illustrated) for positioning the optical fiber 10 and the optical fiber 32 is formed in one or both of the elements 22a, 22b.

By wedging a wedge member (not illustrated) between the elements 22a and 22b to push apart the pair of elements 22a and 22b of the clamp portion 22 against the elasticity of the spring 23, it is possible to insert the distal end portion 32a of the optical fiber 32 in the clamp portion 22.

The optical fiber 32 can be butt-jointed with the ferrule-side optical fiber 10 by being pushed into the ferrule 21 side. The reference numeral 26 in FIG. 1 denotes the connection point of the projected portion 10a of the optical fiber 10 and the distal end portion 32a of the optical fiber 32. It is possible to interpose a refractive index matching material between the end faces of the optical fiber 10 and the optical fiber 32.

Note that in the illustrated example, the clamp portion 22 was adopted with a structure that houses in the spring 23 the element 22a and the element 22b that are integrally formed in the flange portion 21b of the ferrule 21, but the connection structure of the optical fibers is not limited thereto, and provided it is possible to mechanically position and butt together the optical fibers and ensure a stable connection state, another structure may be adopted.

In the connection of the optical fiber 10 and the optical fiber 32, a physical contact (PC) connection may also be adopted that does not employ a refractive index matching material. In this case, it is preferable to make the connection end face of the optical fiber 10 have a curving convex shape. Also, it is preferable to bias the optical fiber 32 toward the optical fiber 10, so as to be butted against the optical fiber 10 with a predetermined pressure.

The spring 4 is provided in the stop ring 12, and biases the clamp ferrule 3 forward by taking reaction force against the stationary portion 14. The spring 4 is for example a coil spring.

As shown in FIG. 5, the fixing cap 5 has a mounting portion 17 that is mounted on the stationary portion 14 and a connecting tube portion 18 that extends rearward from the rear end portion of the mounting portion 17.

A thread portion 19 that screws onto the thread portion 16 of the stationary portion 14 is formed on the inner periphery surface of the mounting portion 17 (refer to FIG. 1 and FIG. 6).

Slip-off prevention projections 25 are formed on the outer periphery surface of the connecting tube portion 18. The slip-off prevention projections 25 serve to prevent the boot 27 from slipping off, and are annular projections in the circumferential direction of the connecting tube portion 18.

As shown in FIG. 1, it is possible to mount the boot 27 on the connecting tube portion 18 of the fixing cap 5. Reference numeral 28 denotes a protective tube that consists of resin or the like.

As the optical connector 1, a so-called LC-type optical connector is illustrated. The optical connector 1 is not limited to an LC-type optical connector, and for example may be an optical connector such as an SC2-type optical connector. An SC2-type optical connector is one that omits the knob that is mounted on the outer side of the housing of an SC-type optical connector from an SC-type optical connector (SC: single fiber coupling optical fiber connector, such as an F04-type optical connector (optical connector plug) stipulated in JIS C 5973, and the like).

Next, the method of assembling the optical connector 1 on the terminal of an optical fiber cable 31 shall be described.

As shown in FIG. 1 and FIG. 3, the optical fiber 32 is extracted from the terminal of the optical fiber cable 31, the tension-resisting members 33 are drawn out, and the covering at the distal end portion of the optical fiber 32 is removed. The distal end portion 32a is for example a bare optical fiber.

By inserting the distal end portion 32a of the optical fiber 32 between the elements 22a, 22b that are pushed apart by the wedge (not illustrated), it is butt-connected with the projected portion 10a of the ferrule-side optical fiber 10.

As shown in FIG. 6 and FIG. 7, the mounting portion 17 of the fixing cap 5 is screwed onto the stationary portion 14. At this time, by arranging the tension-resisting members 33 on the outer periphery of the stationary portion 14, and screwing on the fixing cap 5, the tension-resisting members 33 are sandwiched between the fixing cap 5 and the stationary portion 14.

As shown in FIG. 7, it is preferable for the tension-resisting members 33 to be sandwiched between the fixing cap 5 and the stationary portion 14 in the state of being gathered in bundles.

It is possible to fix the tension-resisting members 33 at positions separated in the circumferential direction of the fixing cap 5 and the stationary portion 14 in the state of being divided and gathered into a plurality of bundles. In the illustrated example, the tension-resisting members 33 are divided into two portions, which are respectively gathered into bundles, and fixed at rotationally symmetrical positions with respect to the center axis of the fixing cap 5 and the stationary portion 14. The tension-resisting members 33 are not limited to two portions, and they may be divided into three or more bundles. It is preferable that the tension-resisting members 33 be sandwiched between the base portion 13 of the stop ring body 12a and the front end face of the fixing cap 5.

Since the tension-resisting members 33 are extremely thin, when the fibers are fixed in a scattered state, the fixing force may be weak. In contrast, by gathering the tension-resisting members 33 into bundles so as to increase the diameter thereof (the diameter of the bundles), the tension-resisting members 33 are sandwiched between the base portion 13 of the stop ring body 12a and the front end face of the fixing cap 5 with a strong force, and thus the fixing strength of the tension-resisting members 33 is increased.

Also, by fixing the plurality of bundles at positions separated in the circumferential direction, it is possible to reduce variations in the force that acts on the stop ring body 12a and the fixing cap 5 by the tension-resisting members 33. Accordingly, it is possible to impart a high strength to the connection portion with an optical fiber cable.

Note that the tension that is acted on the tension-resisting members is received shared between the fixing cap 5 and the stationary portion 14 (thread portion 16), and between the circumferential end face of the fixing cap 5 and base portion 13.

Since the bulging convex portion 24 is formed at the base portion 13 of the stop ring body 12a, the surface area thereof facing the fixing cap 5 increases, and the fixing strength of the tension-resisting members 33 that are sandwiched therebetween is increased.

Also, the front end portion of the fixing cap 5 has a thin wall, and when sandwiching the tension-resisting members 33 between the fixing cap 5 and the base portion 13, it is preferable that the front end portion of the fixing cap 5 be capable of being deformed in accordance with the shape of the sandwiched tension-resisting members 33. Thereby, since the surface area of the portions of the fixing cap 5 that come into contact with the tension-resisting members 33 increases, it is possible to further increase the fixing strength of the sandwiched tension-resisting members 33.

In order to perform such fixing of the tension-resisting members 33, the thickness of the front end portion of the fixing cap 5 is preferably 0.35 to 0.5 mm. Note that thickness of the front end portion means the thickness in the radial direction of the cylindrical fixing cap 5.

In the illustrated example, a method that butt-connects optical fibers between a pair of elements of a clamp portion (mechanical splice method) was adopted, but in the present invention it is also possible to adopt other methods for the optical fiber connection. For example, it is possible to use a fusion splicing method.

In an on-site assembly-type optical connector for a fusion splicing method, unlike the one for mechanical splice method, there is no clamp portion that presses the built-in optical fiber that extends from the flange portion 21b of the ferrule 21.

The built-in optical fiber extends from the rear end of the flange portion 21b, and is fusion spliced with the optical fiber that is extracted at the terminal of the optical fiber cable. In this case, it is possible to reinforce the fusion spliced portion with a commercially available reinforcing sleeve, and house it in the housing.

Also, in the illustrated example, the optical fiber from the optical fiber cable and the built-in fiber are connected in an optical connector, but the present invention can also be applied to a constitution with no built-in optical fiber, that is, to an optical connector with a structure that directly inserts the distal end of an optical fiber extracted at the terminal of an optical fiber cable into an optical fiber hole of a ferrule, exposes it as is to the connection end face, and makes the fiber end nearly flush with the ferrule end.

Also, the present invention can be applied to an optical connector with a structure that has a built-in optical fiber of a length mid-way of the optical fiber hole of the ferrule, directly inserts the distal end of an optical fiber extracted at the terminal of an optical fiber cable into an optical fiber hole of a ferrule, and connects it with the built-in optical fiber midway in the optical fiber hole.

Note that for the splicing method in the above case, it is possible to apply a predetermined abutting force from the optical fiber cable side and apply a PC connection or an abutting connection method that uses a refractive index matching material.

Also, as shown in FIG. 2, the housing 2 is provided with resilient pieces 11b, 12b, but is not limited thereto, and it is possible to adopt one with a structure that does not have elastic pieces.

As given above, there are various modifications to the optical connector to which the present invention is applied, and it is not limited to the embodiment.

According to the present invention, it is possible to provide an optical connector that can easily be assembled and can impart sufficient strength to the connection portion with an optical fiber cable, and a method of assembling the optical connector.

What is claimed is:

1. An optical connector that is assembled at the terminal of an optical fiber cable that integrates an optical fiber and a tension-resisting member extending in the longitudinal direction of the optical fiber, the optical connector comprising:
   a connector body having a stationary portion at the rear end thereof, the stationary portion having a threaded portion formed on the outer periphery surface, and
   a fixing cap that is screwed onto the threaded portion of the stationary portion,
   wherein the fixing cap fixes the tension-resisting member that has been drawn out from the optical fiber cable terminal by sandwiching the tension-resisting member between the fixing cap and the connector body when the fixing cap is screwed onto the stationary portion,
   a front end portion of the fixing cap is thin-walled,
   the connector body comprises the stationary portion and a base portion, the stationary portion extends from the base portion and has a cylindrical shape, and
   when fixing the tension-resisting member, the tension-resisting member is sandwiched between the fixing cap and the base portion of the connector body, and the front end portion of the fixing cap is deformed in accordance with the shape of the sandwiched tension-resisting member.

2. An optical connector that is assembled at the terminal of an optical fiber cable that integrates an optical fiber and tension-resisting members extending in the longitudinal direction of the optical fiber, the optical connector comprising:
   a connector body having a stationary portion at a rear end thereof, the stationary portion having a threaded portion formed on the outer periphery surface, and
   a fixing cap that is screwed onto the threaded portion of the stationary portion,
   wherein the fixing cap fixes the tension-resisting members that have been drawn out from the optical fiber cable terminal by sandwiching the tension-resisting members between the fixing cap and the connector body when the fixing cap is screwed onto the threaded portion of the stationary portion,
   the tension-resisting members are divided into a plurality of bundles and respective bundles are fixed to positions separated in the circumferential direction of the connector body,
   the connector body comprises the stationary portion and a base portion, the stationary portion extends from the base portion and has a cylindrical shape,
   when fixing the tension-resisting members, the tension-resisting members are sandwiched between the fixing cap and the stationary portion and between the fixing cap and the base portion,
   a front end portion of the fixing cap is thin-walled, and
   the front end portion of the fixing cap is deformed in accordance with the shape of the tension-resisting members that are sandwiched between the front end portion of the fixing cap and the base portion.

3. The optical connector according to claim 2, wherein the plurality of bundles of the tension-resisting members are fixed at rotationally symmetrical positions with respect to the center axis of the stationary portion.

4. A method of assembling a connector body of an optical connector at the terminal of an optical fiber cable that integrates an optical fiber and tension-resisting members, the method comprising:
   screwing the fixing cap onto a threaded portion formed on the outer periphery surface of a stationary portion of the connector body,
   positioning portions of the tension-resisting members that have been drawn out from the terminal, such that when the fixing cap is screwed onto the threaded portion of the stationary portion, the tension-resisting members are sandwiched between the fixing cap and the connector body, and
   deforming a front end portion of the fixing cap which is thin-walled in accordance with the shape of the sandwiched tension-resisting member between the fixing cap and the connector body.

5. The method according to claim 4, wherein during positioning of the tension-resisting members, the tension-resisting members are divided into a plurality of bundles and respective bundles are arranged at positions separated in the circumferential direction of the connector body.

* * * * *